J. B. Koon.
Horse Rake.

No 92732.  Patented July 20, 1869.

WITNES'S.

INVENTOR. Joseph B. Koon
ASSIGNOR TO,
ALDEN & Co,
AUBURN. N.Y.

United States Patent Office.

JOSEPH B. KOON, OF AURELIUS, ASSIGNOR TO ALDEN AND COMPANY, ASSIGNORS TO GEORGE J. LETCHWORTH, OF AUBURN, NEW YORK.

Letters Patent No. 92,732, dated July 20, 1869.

IMPROVEMENT IN HORSE-RAKES.

The Schedule referred to in these Letters Patent and making part of the same

*To all whom it may concern:*

Be it known that I, JOSEPH B. KOON, of the town of Aurelius, in the county of Cayuga, and State of New York, have invented a new and useful Appliance as an Attachment to Horse-Rakes, for raking hay, grain, and other like substances; and I do hereby declare that the following is a full, clear, and exact description of the same, reference being had to the annexed drawing, forming a part of this specification, in which—

Figure 1:
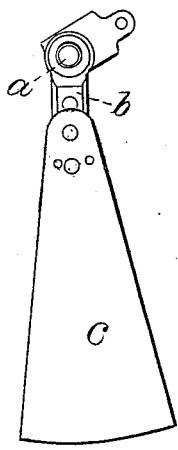
Figure 1 represents a side view of this improvement to horse-rakes, which consists of a board or other suitable material, of such form and shape as will answer for a wheel-guard and separator between the teeth of the rake and the wheels of the vehicle, wherever and however attached.
Figure 2:
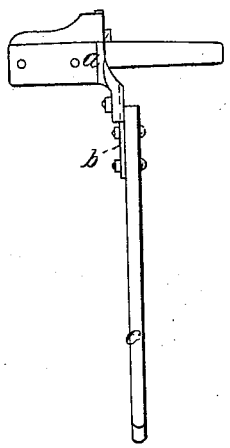
Figure 2 represents an edge or track view of the same.
Figure 3:
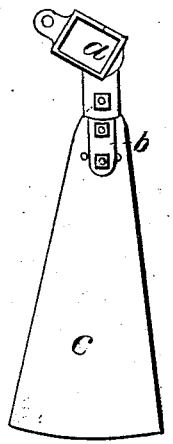
Figure 3 represents a reverse view of fig. 1.
Figure 4:
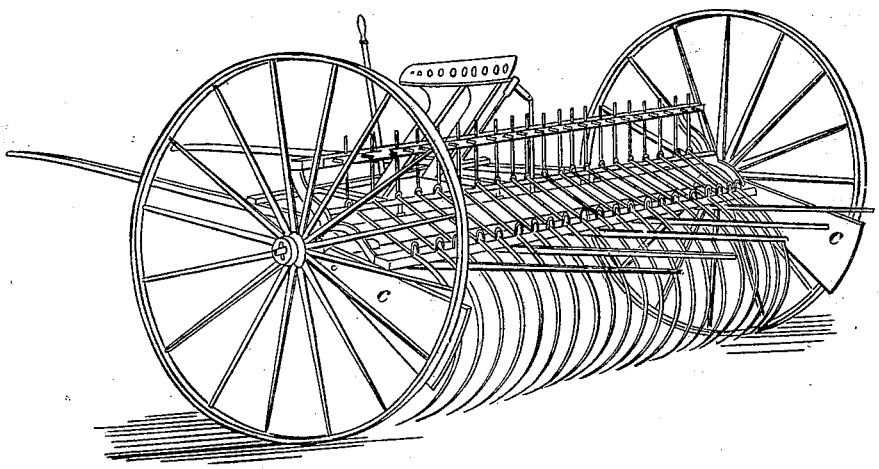
Figure 4 represents a sulky horse-rake, with these adjustable guard and separating-boards attached, in working-order.

Figs. 1, 2, and 3. $a$ represents the axle-tree arm, one end of which is the arm, and on which the rake's wheel is attached, while the other end is constructed to receive the rake's head, to which it is properly secured, which, when secured, is ready to receive the wheel; and when the other or opposite end is correspondingly completed, the other necessary appliances may be at once added, and the rake completed for service.

$b$ represents the connecting-piece or strap, one of which is bolted or otherwise secured to the axle-tree arm $a$, in whatever way or manner may seem most suitable and expedient for the time being, agreeable to the constructor's pleasure.

This connecting-piece $b$ has three holes, one of which is required to secure it to the piece $a$, while the central hole is used as a pivot for the guard or separator $c$, and where it is secured; and the lower hole is used for the adjustableness of the separator $c$, by means of holes or their equivalent radiating from the central or pivot-hole in the separator.

The difficulty heretofore attending the raking of hay or other like substances, by means of horse-rakes, is manifest, from the fact of the substance raked becoming tangled or clogged between the teeth of the rake and the wheels, and winding up or twisting upon the axle-tree, thus obstructing the motion of the vehicle; and when used for raking stubble, the straw and heads of grain, coming in direct contact with the spokes of the revolving wheel, form a threshing-arrangement, whereby considerable amount of the heads is threshed, and the grain wasted on the ground; and in like manner, to gather up the end-waste, during the process of hay-raking, it is necessary to have a considerable overlap, whereby much area is raked over twice.

By the adoption and use of these guards and separators, all these previous difficulties are overcome, as the substance being raked is kept free from the wheels during the process of raking, enabling the party to take full breadths, whereby a much greater area is raked in the same space of time, and with greater ease and freedom to the operating and propelling-power.

Having thus fully described my invention,

What I claim therein as new, and desire to secure by Letters Patent, is—

The relative arrangement of the guard-board C to the teeth and axle of the rake, and the method for fastening the same, as represented and described.

JOSEPH B. KOON.

Witnesses:
HORACE T. COOK,
SEYMOUR SMITH.